United States Patent Office 2,808,162
Patented Oct. 1, 1957

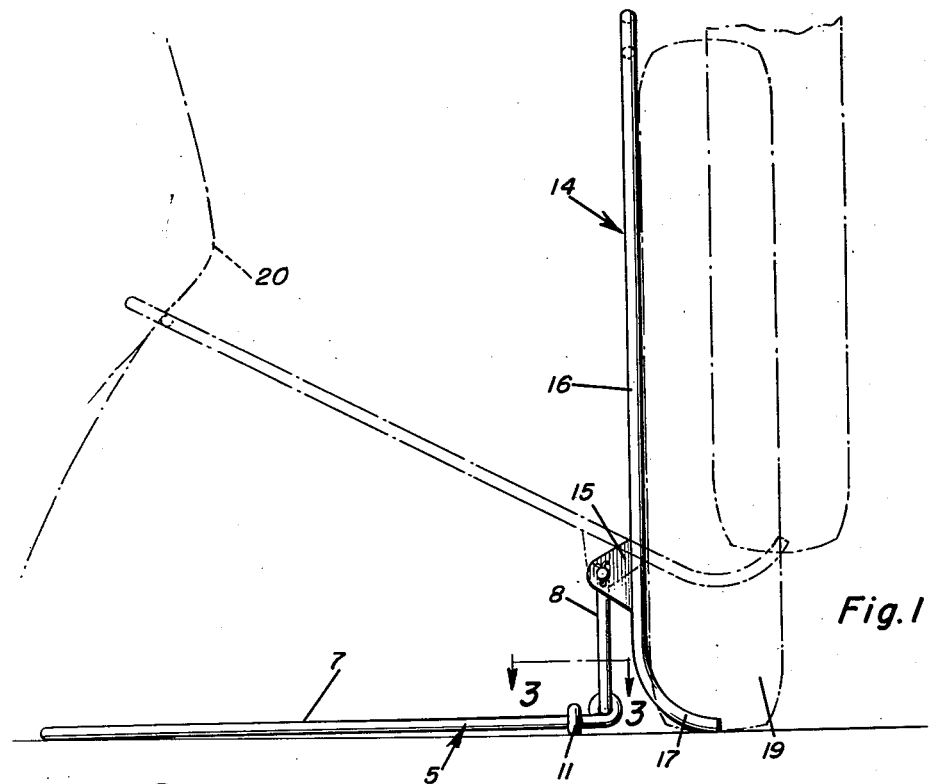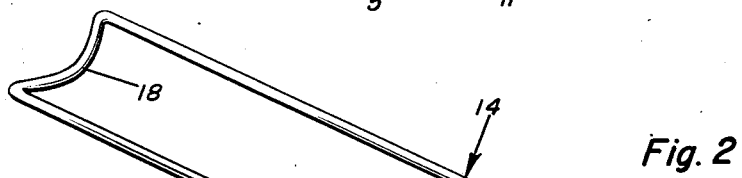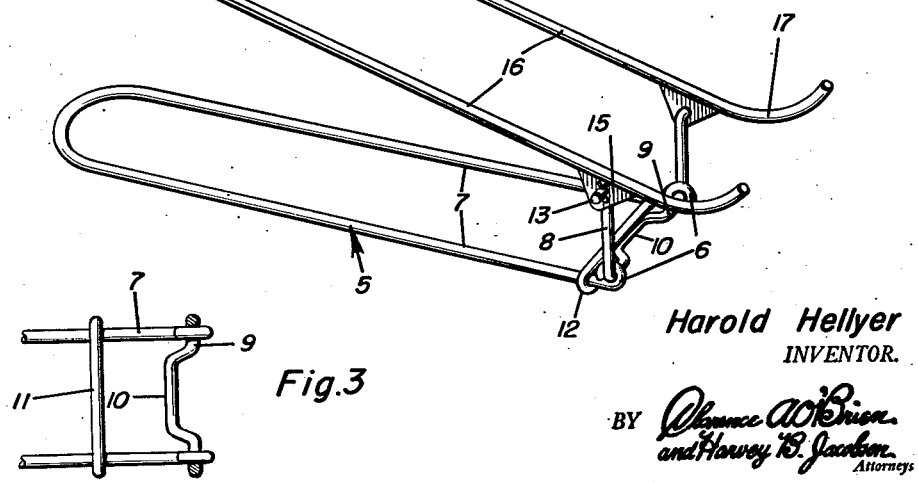

2,808,162

VEHICLE WHEEL JACK

Harold Hellyer, Pottsville, Pa.

Application November 3, 1953, Serial No. 389,921

5 Claims. (Cl. 214—332)

The present invention relates to new and useful improvements in jacks for lifting a tire and wheel into position for mounting the wheel on the axle of a vehicle and relieving the person who is performing this duty from the weight and strain usually caused by directly lifting the wheel.

An important object of this invention is to provide a wheel lifting lever which is pivotally mounted on a base structure and with one end of the lever adapted for engaging under the tire while the other end of the lever is swung downwardly to lift the mounted tire into a desired position.

Another object of this invention is to provide a collapsible jack of this character and including an upstanding fulcrum or post structure for the lever and which is swingable downwardly with the lever onto the base in a folded or collapsed position and equipping the base structure with a latch bar to lock the fulcrum or post in an upright position.

A still further object is to provide a device of this character of simple and practical construction, which is strong and durable, relatively inexpensive to manufacture and otherwise well adapted for the purpose for which the same is intended.

Other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view;
Figure 2 is a perspective view; and
Figure 3 is a fragmentary sectional view, taken on a line 3—3 of Figure 1.

Referring now to the drawing in detail wherein for the purpose of illustration I have disclosed a preferred embodiment of the invention, the numeral 5 designates a base structure composed of a U-shaped metal rod having eyes 6 at the end portion of its legs 7 and in which a substantially U-shaped fulcrum or post member 8 is pivotally mounted. The fulcrum or post member 8 includes a cross member 9 which is rockably mounted in the eyes 6 and the central portion of the cross member 9 is formed with an offset or crank 10.

A locking bar 11 is formed at its ends with eyes 12 which are slidably mounted on the leg portions 7 of the base 5 into and out of the overlying position with respect to the crank or offset portion 10 of the fulcrum or post member to support the latter in an upstanding position.

The upper ends of the fulcrum or post member 8 are formed with horizontal extensions 13 for rockably mounting a lever 14 thereon by means of apertured ears 15. The lever 14 is also of U-shaped construction and the apertured ears 15 are welded or otherwise suitably secured to the leg portions 16 of the lever adjacent the end portion of said leg members. The ends or tips of the leg members 16 are curved upwardly as shown at 17.

The leg members 16 are united at their other ends by an inwardly curved crossbar 18.

In the operation of the device, the base member 5 is placed on the ground and a fulcrum or post member 8 is locked in an upstanding position by the locking bar 11 which overlies the crank 10. The lever 14 is then raised into a perpendicular position, as shown by full lines in Figure 1 of the drawing so as to engage the curved ends or tips 17 of the lever under a mounted automobile tire 19 with the two tips engaging the tire one on each side of its point of contact with the ground. The lever is then pulled downwardly to raise the wheel assembly into a position for mounting the same onto the axle of the vehicle and while manipulating the wheel into position, the lever 14 may be held in its lowered position by the knee 20 of a person pressing downwardly on the crossbar 18 and with his foot pressing on the base frame 5 to hold the jack in position.

The jack may be folded or collapsed into a compact form by sliding the locking bar 11 away from the crank portion 10 of the fulcrum or post member 8 so that the upper ends of the latter may then swing downwardly into the plane of the base 5 and the lever 14 may then be swung downwardly on top of the base.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. The wheel jack comprising a base, a substantially U-shaped jack post pivoted to the base for collapsing thereon, said post including a horizontal central portion and a pair of upstanding end portions, means lockably engaging the horizontal central portion of the post to support the end portions of the latter in an upstanding position, and a lever pivoted to the end portions of the post and having one end engageable under a mounted tire to raise the latter.

2. A wheel jack comprising a base, a substantially U-shaped jack post pivoted to the base for collapsing thereon, said post including a horizontal central portion and a pair of upstanding end portions, a locking member slidably mounted on the base and engaging the horizontal central portion of the post and locking the end portions of the post in an upstanding position, and a lever pivoted to the end portions of the post and having one end engageable under a mounted tire to raise the latter.

3. A wheel jack comprising a base, a substantially U-shaped collapsible jack post pivoted to the base and having a right angularly projecting portion at the lower portion of the post, a locking member slidably mounted on the base and engageable with said right angularly projecting portion of the post for locking the post in an upstanding position, and a lever pivoted to the post and having one end engageable under a mounted tire to raise the latter.

4. A wheel jack comprising a base, a substantially U-shaped collapsible jack post pivoted to the base and having a right angularly projecting portion at the lower portion of the post, a locking bar slidably mounted on the base and movable into a position overlying said right angularly projecting portion of the post to lock the latter in an upstanding position, and a lever pivoted to the post and having one end engageable under a mounted tire to raise the latter.

5. The combination of claim 4 wherein both the base and the lever are of open frame construction and said lever includes an upwardly curved end portion for engaging under the mounted tire.

References Cited in the file of this patent

UNITED STATES PATENTS

| | | |
|---|---|---|
| 535,596 | Minto | Mar. 12, 1895 |
| 1,542,672 | Crapo | June 16, 1925 |
| 1,957,126 | Appel | May 1, 1934 |
| 2,195,635 | Smischny | Apr. 2, 1940 |
| 2,506,081 | Hanrahan | May 2, 1950 |
| 2,517,631 | Coleman | Aug. 8, 1950 |
| 2,543,276 | Buechler | Feb. 27, 1951 |
| 2,547,474 | Munyon | Apr. 3, 1951 |
| 2,691,454 | Dembo | Oct. 12, 1954 |